United States Patent
Kushida et al.

(10) Patent No.: US 8,200,287 B2
(45) Date of Patent: Jun. 12, 2012

(54) ANTENNA SWITCHING METHOD OF WIRELESS COMMUNICATION SYSTEM

(75) Inventors: Toshihiko Kushida, Osaka (JP); Takayoshi Obatake, Nishinomiya (JP)

(73) Assignee: Maeda Metal Industries, Ltd., Osaka (JP)

( * ) Notice: Subject to any disclaimer, the term of this patent is extended or adjusted under 35 U.S.C. 154(b) by 108 days.

(21) Appl. No.: 12/911,898

(22) Filed: Oct. 26, 2010

(65) Prior Publication Data

US 2011/0105038 A1   May 5, 2011

(30) Foreign Application Priority Data

Nov. 5, 2009   (JP) ................ 2009-253790

(51) Int. Cl.
  *H04M 1/00*   (2006.01)
  *H04W 4/00*   (2009.01)
(52) U.S. Cl. .................. 455/562.1; 370/334
(58) Field of Classification Search .......... 455/561, 455/562.1, 277.1, 277.2, 78, 13.3, 134, 135, 455/525, 73, 226.3; 370/259, 253, 342, 316, 370/328, 326, 334; 343/757, 765, 766, 840, 343/873, 906, 882
See application file for complete search history.

(56) References Cited

U.S. PATENT DOCUMENTS

| | | | | |
|---|---|---|---|---|
| 5,561,673 A | * | 10/1996 | Takai et al. | 714/708 |
| 6,034,643 A | * | 3/2000 | Nishikawa et al. | 343/765 |
| 2006/0005637 A1 | * | 1/2006 | Hirai et al. | 73/862.21 |
| 2009/0196162 A1 | * | 8/2009 | Sambhwani et al. | 370/201 |

FOREIGN PATENT DOCUMENTS

JP   2000-353998   12/2000

* cited by examiner

*Primary Examiner* — Nay A Maung
*Assistant Examiner* — Cindy Trandai
(74) *Attorney, Agent, or Firm* — Eckert Seamans Cherin & Mellott, LLC; Kirk D. Houser

(57) ABSTRACT

An antenna switching method of a wireless communication system capable of efficiently transmitting various signals from a plurality of transmitting antennas to a receiving unit is provided. The method includes a received signal intensity measuring step of operating an antenna switch (23) and obtaining received signal intensities of all the transmitting antennas (24, 25), a step of comparing the obtained received signal intensities of all the transmitting antennas and determining a transmitting antenna wherein the received signal intensity is the highest, a step of operating the antenna switch so that the transmitting antenna wherein the received signal intensity is the highest is connected to a transmitting circuit 22 and fixing the transmitting antenna, and a step of transmitting signals thereafter from the transmitting circuit via the fixed transmitting antenna.

4 Claims, 4 Drawing Sheets

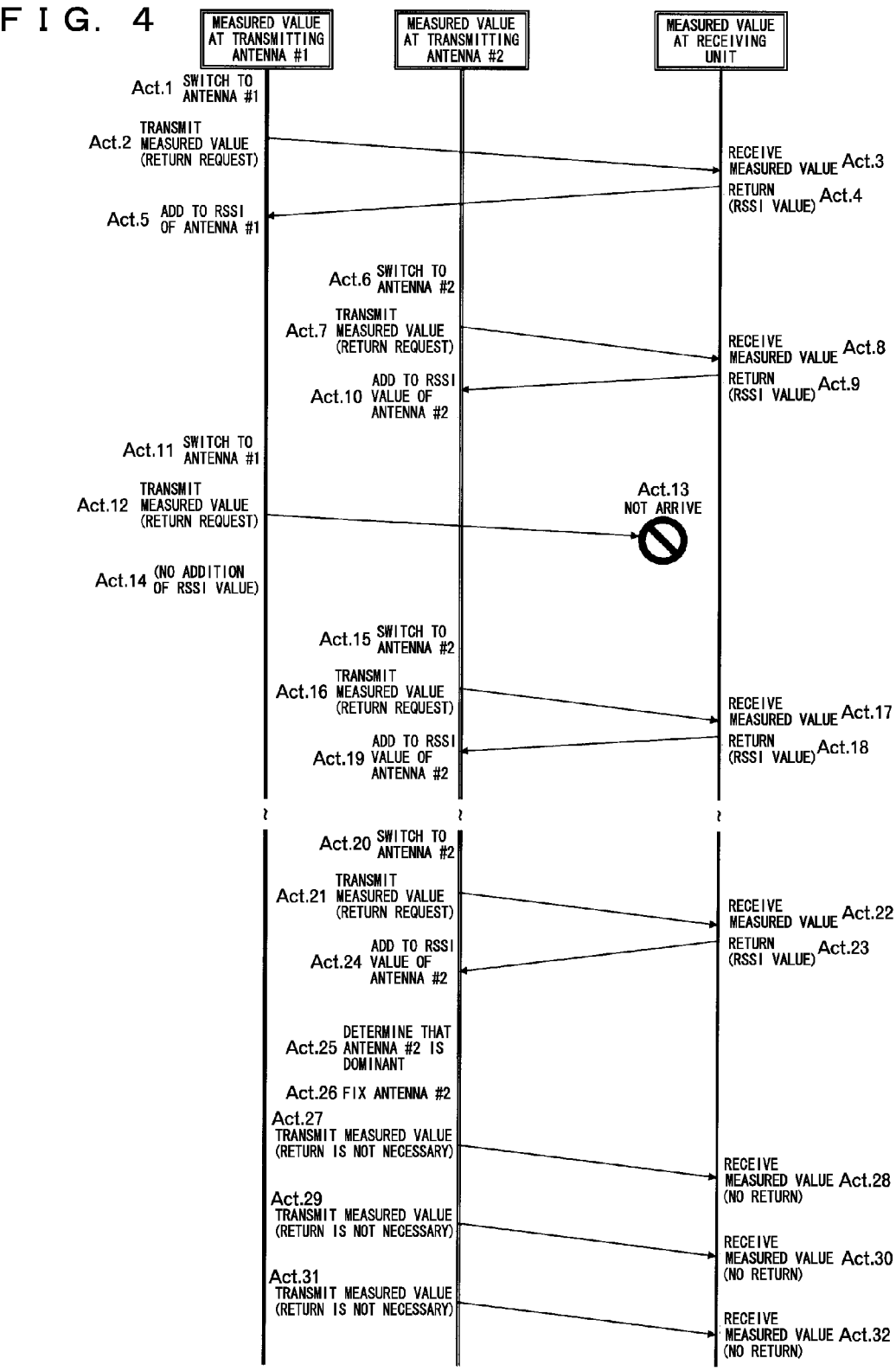

ANTENNA SWITCHING METHOD OF WIRELESS COMMUNICATION SYSTEM

BACKGROUND OF THE INVENTION

1. Field of the Invention

The present invention relates to an antenna switching method of a wireless communication system for selecting one antenna, excellent in a communication quality state, from a plurality of antennas and being capable of performing transmission/reception. More specifically, the invention relates to the antenna switching method of a wireless communication system for accelerating establishment of a communication state, stably transmitting/receiving a signal, and reducing battery consumption.

2. Description of the Related Art

The applicant proposes a wireless communication system that incorporates a transmitting unit in a tightening torque measuring unit attached to a rotating shaft of a tightening machine or the like and is capable of wirelessly transmitting tightening information such as a torque value and a rotating angle to a receiving unit.

However, the tightening torque measuring unit has one antenna on a transmitting side, and this unit rotates integrally with the rotating shaft. For this reason, when the transmitting antenna moves to a position where a quality state of the communication with a receiving unit is deteriorated due to a position where the tightening torque measuring unit stops, transmission/reception of a signal to/from the receiving unit possibly fails.

It is considered that a plurality of transmitting antennas is successively switched and signals are successively transmitted (for example, see Japanese Unexamined Patent Publication No. 2000-353998). In this case, however, there arises the problem that the transmitting/receiving operation in a bad communication quality state is repeated at constant intervals.

Therefore, a method for arranging a plurality of transmitting antennas on a tightening torque measuring unit and transmitting tightening information from the transmitting antennas all together is considered. However, since the tightening torque measuring unit rotates integrally with the rotating shaft as described above, the unit should be driven by a battery as a power source. Hence, there arises the problem that increase in power consumption causes consumption of the battery to be sped up.

These problems are desired to be resolved not only in the torque measuring unit but also particularly in wireless communication systems required to sequentially transmit various signals.

SUMMARY OF THE INVENTION

It is an object of the present invention to provide an antenna switching method of a wireless communication system that can transmit efficiently various signals from a plurality of transmitting antennas to a receiving unit, and particularly the antenna switching method that is suitable for a transmitting unit arranged on a member in which a plurality of transmitting antennas is rotatable and a wireless communication system using a battery-driven type transmitting unit.

In order to solve the above problem, the present invention provides an antenna switching method of a wireless communication system which includes:

a transmitting unit having a transmitting circuit for transmitting/receiving a signal, a plurality of transmitting antennas for transmitting/receiving, an antenna switch for switching any one of the plurality of the transmitting antennas to be connected to the transmitting circuit and a transmitting controller for controlling the transmitting circuit and the antenna switch, the transmitting circuit capable of transmitting a signal including a return request and transmitting/receiving another signals; and a receiving unit having a receiving circuit for transmitting/receiving a signal to/from the transmitting unit, a receiving antenna connected to the receiving circuit, and a receiving controller for controlling the receiving circuit, the receiving controller transmitting a return signal from the receiving circuit when receiving the signal including the return request from the transmitting unit, the antenna switching method includes:

a received signal intensity measuring step having a step of allowing the transmitting controller to operate the antenna switch so that any one of the transmitting antennas is connected to the transmitting circuit, transmitting the signal including the return request from the transmitting circuit via the transmitting antenna, standing by in a receiving state of the return signal, when receiving the signal including the return request, allowing the receiving controller to transmit the return signal from the receiving circuit via the receiving antenna, and allowing the transmitting controller to measure and store a received signal intensity of the return signal received by the transmitting antenna within a predetermined time, and a step of operating the antenna switch and performing the above step on all the other transmitting antennas so as to obtain received signal intensities for all the transmitting antennas;

a step of allowing the transmitting controller to compare the obtained received signal intensities of all the transmitting antennas and determine the transmitting antenna wherein the received signal intensity is the highest;

a step of allowing the transmitting controller to operate the antenna switch so that the determined transmitting antenna wherein the received signal intensity is the highest is connected to the transmitting circuit and fix the transmitting antenna; and a step of allowing the transmitting controller to transmit signals thereafter from the transmitting circuit via the fixed transmitting antenna.

The transmitting unit operates the antenna switch so that the signals including the return request are sequentially transmitted/received from all the transmitting antennas, and measures the received signal intensities of the transmitting antennas from the receiving unit. As a result, since the transmitting antenna wherein the received signal intensity is the highest can be selected and fixed, optimization can be performed so that defective transmission/reception is reduced.

After the transmitting antenna is fixed, since only the fixed transmitting antenna transmits a signal, establishment of a communication state can be accelerated, and a signal can be stably transmitted/received. Further, battery consumption can be reduced, and share of a wireless frequency space can be cut down.

BRIEF DESCRIPTION OF THE DRAWINGS

FIG. 4 is a sequence diagram illustrating the antenna switching method of the wireless communication system of the present invention.

DETAILED DESCRIPTION OF THE PREFERRED EMBODIMENTS

An embodiment in which a transmitting unit 20 of a wireless communication system 10 of the present invention is mounted to a tightening torque measuring unit 30 attachable to a rotating shaft 50 of a tightening machine is described below with reference to the drawings.

However, the transmitting unit 20 is not limited to application to the tightening torque measuring unit 30, and is suitably mounted to other members, particularly, rotatable members.

Figure 1:
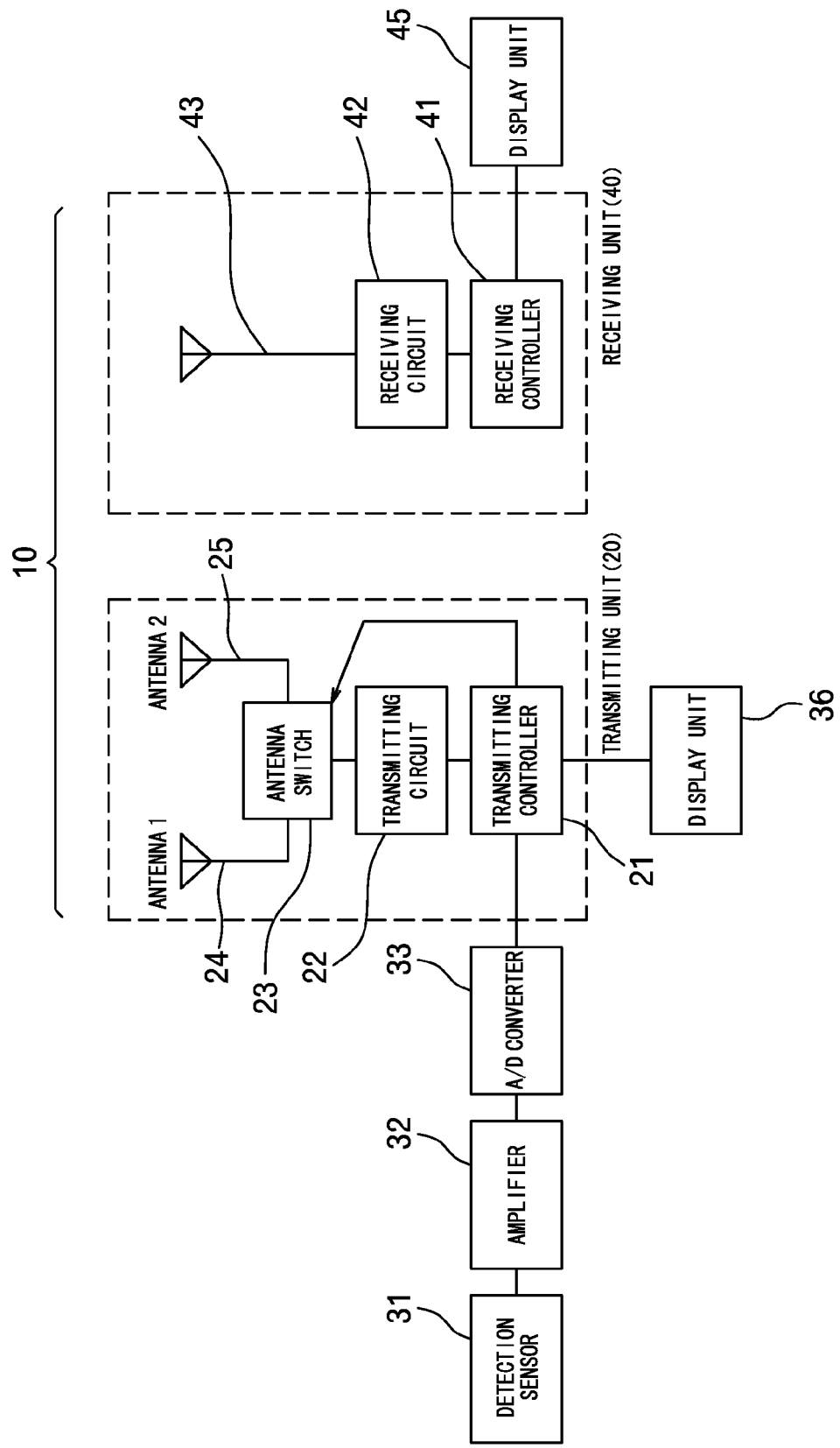
FIG. 1 is a block diagram illustrating a wireless communication system of the present invention.
Figure 2:
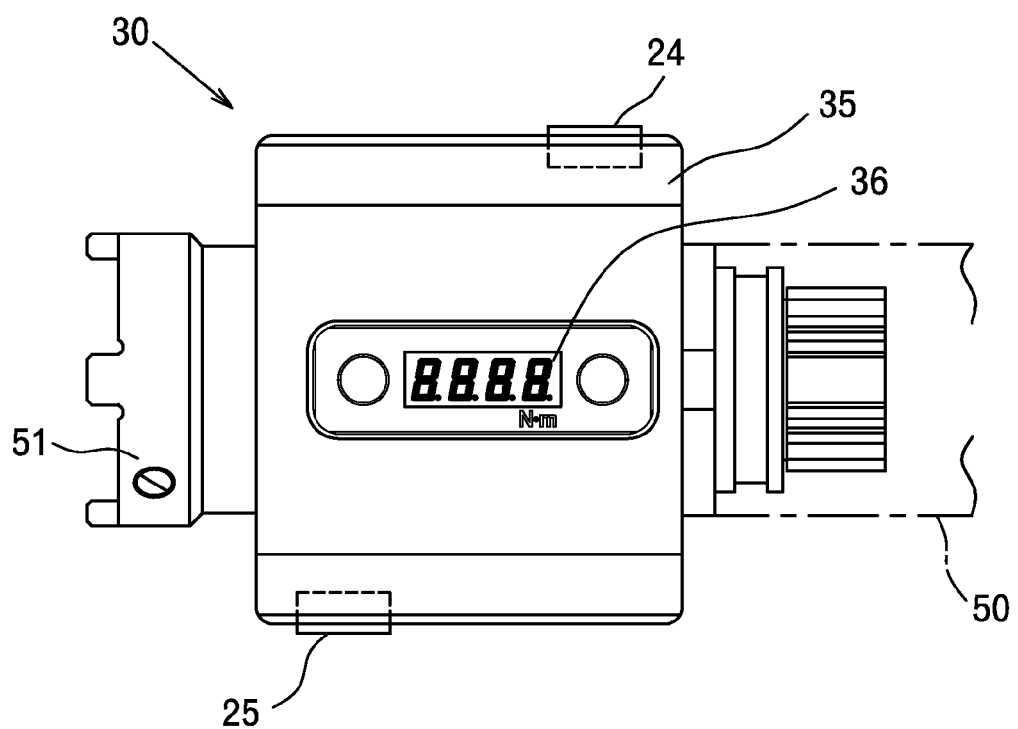
FIG. 2 is an explanatory diagram illustrating an embodiment in which a transmitting unit of the present invention is mounted to a tightening torque measuring unit of a tightening machine.

FIG. 1 is a block diagram illustrating the wireless communication system 10 of the present invention. The wireless communication system 10 of the present invention has the transmitting unit 20 for transmitting various signals, and a receiving unit 40 for receiving signals from the transmitting unit 20. The transmitting unit 20 can be arranged on the tightening torque measuring unit 30 as shown in FIG. 2.

<Transmitting Unit 20>

The transmitting unit 20, as shown in FIG. 1, has a transmitting circuit 22 (RF circuit) for transmitting/receiving signals, and a plurality of transmitting antennas 24, 25 for transmitting/receiving. An embodiment in which the two transmitting antennas (the transmitting antenna 1 (24) and the transmitting antenna 2 (25)) are used is described below, but the number of the transmitting antennas may be three or more.

A power can be supplied to the transmitting unit 20 by a battery not shown.

The transmitting unit 20 can be housed in a suitable place in a tubular casing 35 of the tightening torque measuring unit 30, described later. As shown in FIG. 2, it is desirable that the transmitting antenna 1 (24) and the transmitting antenna 2 (25) are arranged near an outer periphery of the casing 35 at a predetermined interval. In this embodiment, they are arranged so as to be opposed to each other via a shaft center. Further, they are arranged at opposing corners so as to be separated by ½ or more wavelength of a wireless communication frequency used by the adjacent antennas.

Any one of the transmitting antennas 24, 25 is selected so as to be electrically connected to the transmitting circuit 22 via an antenna switch 23.

The transmitting circuit 22 and the antenna switch 23 are controlled by a transmitting controller 21.

The transmitting controller 21 can be constituted by a CPU, a memory or the like. The transmitting controller 21 processes an output from a detection sensor 31 described later, processes various signals transmitted from the transmitting circuit 22, measures, stores and compares received signal intensities of return signals received via the transmitting antennas 24, 25. The transmitting controller 21 selects the transmitting antenna 24 or 25 and operates the antenna switch 23 so as to switch the transmitting antenna 24 or 25 that should transmit a signal. As a signal transmitted from the transmitting circuit 22, a signal including a return request and/or tightening information detected by the detection sensor 31, described later, can be exemplified.

Figure 3:
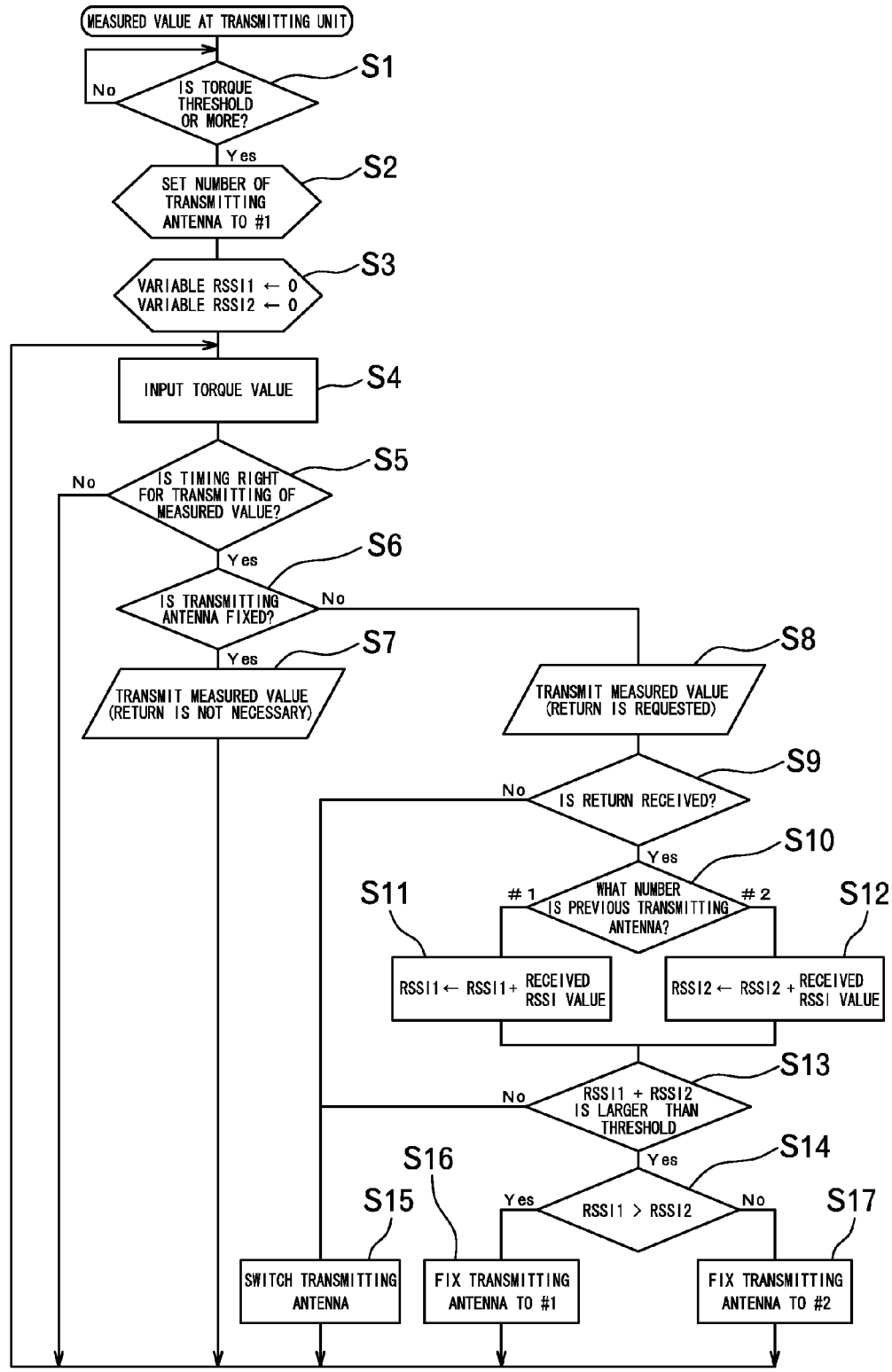
FIG. 3 is a flowchart illustrating an antenna switching method of the wireless communication system of the present invention.

An operation of the transmitting controller 21 is described in detail below with reference a flowchart of FIG. 3 and a sequence diagram of FIG. 4.

<Tightening Torque Measuring Unit>

The tightening torque measuring unit 30 on which the transmitting unit 20 is arranged is, as shown in FIG. 2, mounted to the rotating shaft 50 of the tightening machine in a detachable or fixed manner. The tightening torque measuring unit 30 has an outer periphery surrounded by the casing 35, and has the transmitting unit 20 arranged inside. As shown in FIG. 1, the tightening torque measuring unit 30 has the detection sensor 31 for electrically detecting a torque applied to the rotating shaft 50, an amplifier 32 for amplifying the tightening information output from the detection sensor, and an A/D converter 33 for A/D-converting the amplified tightening information. The tightening information converted into a digital signal by the A/D converter 33 is transmitted to the transmitting controller 21.

As the detection sensor 31 for measuring information about tightening, when a tightening torque is measured as the tightening information, a strain gauge can be exemplified. Further, when information about the rotating angle is measured as the tightening information, an encoder, a gyro sensor, a photo interrupter, or a magnetic sensor can be exemplified. When the detection sensor 31 outputs a digital signal like an encoder or a photo interrupter, the A/D converter 33 can be omitted.

The detection sensor 31 is not limited to the above, but various devices can be surely used.

In the following description, a torque is exemplified as the tightening information.

The tightening torque measuring unit 30 can be driven by a battery (not shown) arranged in the casing 35 as a power supply. The battery may be shared by the transmitting unit 20.

A display unit 36 may be arranged on the tightening torque measuring unit 30 as shown in FIG. 2, so that the tightening information can be visually recognized in a direct manner.

<Receiving Unit 40>

A signal transmitted from the transmitting unit 20 can be received by a receiving unit 40 shown in FIG. 1.

The receiving unit 40 has a receiving antenna 43, a receiving circuit 42 (RF circuit) and a receiving controller 41. A signal transmitted from the transmitting unit 20 is received by the receiving controller 41 via the receiving antenna 43 and the receiving circuit 42.

Every time the receiving controller 41 receives a signal including a return request in a receiving standby state, it transmits a return signal including an RSSI value (received signal intensity value) from the receiving circuit 42 via the receiving antenna 43.

When the receiving controller 41 incorporates a memory (not shown) or is connected to a display unit 45, the received tightening information can be stored in the memory or can be suitably displayed on the display unit 45.

A device identification number of the tightening torque measuring unit 30, a time, and position information such as a tightening position are included in the signal about the tightening information transmitted from the transmitting unit 20. This can be used for display and management of the tightening information on the receiving side.

The receiving unit 40 and the display unit 45 can be driven by a commercial power supply or a battery as a power supply.

<Description of Operation>

An operation of the antenna switch 23 of the receiving unit 40 in the wireless communication system 10 having the above constitution is described with reference to the flowchart of FIG. 3 and the sequence diagram of FIG. 4.

A front end socket 51 of the rotating shaft 50 of the tightening machine is fitted into a bolt or a nut and started to be tightened.

The detection sensor 31 detects a torque applied to the rotating shaft 50, the amplifier 32 amplifies the torque, and the A/D converter 33 A/D-converts the torque. The converted torque is transmitted to the transmitting controller 21 (step 1).

The transmitting controller 21 does not transmit a torque value from the transmitting circuit 22 until the tightening information detected by the detection sensor 31 satisfies a predetermined condition, in this embodiment, until the torque value becomes a predetermined threshold or more. (step 1). This is because when the torque value is the predetermined threshold or less, the rotating shaft 50 rotates, and a position of the tightening torque measuring unit 30, namely, positions of the transmitting antennas 24, in a rotating direction are not fixed.

When the tightening proceeds, the torque rises and exceeds the predetermined threshold (step 1), the rotating shaft 50 of the tightening machine hardly rotates, and the tightening torque measuring unit 30 attached to the rotating shaft 50 and the position in the rotating direction are approximately fixed. Therefore, the positions of the transmitting antennas 24, 25 are unmoving.

In this state, the transmitting controller 21 operates the antenna switch 23 so as to set any one of the transmitting antennas 24, 25 to be connected to the transmitting circuit 22 (step 2, action 1: for example, the transmitting antenna 1 (24) is connected to the transmitting circuit 22). In this state, the signal is not yet transmitted.

In the state that the transmitting antenna 1 (24) is connected to the transmitting circuit 22, the transmitting controller 21 resets each RSSI integrated value to be retained to zero. A received signal intensity integrated value on the transmitting antenna 1 (24) is determined as an RSSI1, and a received signal intensity integrated value on the transmitting antenna 2 (25) is determined as an RSSI 2.

A torque value is sequentially input into the transmitting controller 21 at every predetermined time (step 4). When a predetermined measured value transmitting timing comes (step 5) and the transmitting antennas 24, 25 are not fixed (steps 16 and 17, described later) (step 6), the transmitting controller 21 transmits the signal including the return request and the torque value from the transmitting circuit 22 via the transmitting antenna 1 (24) (step 8, action 2). As a result, measurement of RSSI of each of the transmitting antennas 24, 25 (a received signal intensity measuring step) is started.

As the measured value transmitting timing at step 5, timing at which the torque value is input at the predetermined number of times (for example, 10 times) can be exemplified.

When the receiving unit 40 receives the signal including the return request (action 3), the receiving controller 41 returns a signal (return signal) including the received signal intensity value (RSSI) from the receiving circuit 42 via the receiving antenna 43 (action 4).

When the transmitting unit 20 receives the returns signal via the receiving antenna 24 (step 9, action 5), it updates the RSSI integrated value (RSSI1) of an antenna number of the transmitting antenna that transmits the signal (in this case, the transmitting antenna 1 (24)) (step 11). The RSSI1 is calculated by multiplying a value of original RSSI1 (at first, zero) by the received RSSI.

A determination is made whether a sum of the RSSI values of the two antennas is larger than a predetermined threshold at next step 13. As a result, a determination is made whether the transmitting antenna 24 or 25 are selected and fixed (steps 14, 16 and 17) at this step. This is described later.

When the return signal is received within a predetermined time and the sum of the RSSI values of both the transmitting antennas 24, 25 is the predetermined threshold or less (step 13) or when the return signal is not received (step 9), the transmitting controller 21 operates the antenna switch 23 so as to switch the transmitting antenna from the transmitting antenna 1 (24) to the transmitting antenna 2 (25) (step 15, action 6).

After the antenna is switched, the tightening information is sequentially input into the transmitting controller 21 at every predetermined time similarly to the above (step 4), and when the predetermined measured value transmitting timing comes (step 5), the tightening information and the signal including the return request are transmitted from the transmitting circuit 22 via the transmitting antenna 2 (25) (step 8, action 7).

When the receiving unit 40 receives the signal including the return request (action 8), the receiving controller 41 returns a signal including a received signal intensity value (RSSI) (return signal) from the receiving circuit 42 via the receiving antenna 43 (action 9).

When the transmitting unit 20 receives the return signal via the transmitting antenna 2 (25) (step 9, action 10, it updates the RSSI integrated value (RSSI 2) of the transmitting antenna 2 (25) (step 11). The RSSI 2 is calculated by multiplying a value of original RSSI 2 (at first, zero) by the received RSSI.

When the return signal is received within the predetermined time and the RSSI values of both the transmitting antennas 24, 25 do not satisfy the predetermined condition (step 13) or when the return signal is not received (step 9), the transmitting controller 21 operates the antenna switch 23) so as to again switch the transmitting antenna from the transmitting antenna 2 (25) to the transmitting antenna 1 (24) (step 15, action 11).

At the above step, when the signal including the return request transmitted from any one of the transmitting antennas 24, 25 does not yet arrive at the receiving unit 40 (for example, action 13), the return signal is not transmitted from the receiving unit 40 (No at step 9). For this reason, the RSSI values are not added (action 14).

When the sum of the RSSI integrated values of both the transmitting antennas 24, 25 is larger than the predetermined threshold at step 13, the transmitting controller 21 compares the RSSI values of both the transmitting antennas 24, 25 (step 14, action 25). The transmitting controller 21 selects the transmitting antenna 24 or 25 whose RSSI value is larger and operates the antenna switch 23 so as to fix the transmitting antenna 24 or 25 (steps 16 and 17, action 26).

For example, when the transmitting antenna 2 (25) is selected and fixed, the transmitting thereafter is performed from the transmitting antenna 2 (25) (steps 6 and 7). After the transmitting antenna is fixed, the signal transmitted from the transmitting unit 20 may not include the return request (actions 27 to 32).

The receiving unit 40 receives a signal including a torque value transmitted from the transmitting unit 20, and stores it in the memory or displays it on the display unit 45. The number of the transmitting antenna and the RSSI value may be also displayed together.

When the torque value does not fluctuate for predetermined time or the torque value that once rises reduces after its peak, a determination is made that one tightening operation is completed, and the transmitting of the signal including the torque value may be stopped. When new tightening is performed and the torque value becomes the predetermined threshold or more (step 1), the above flow is again performed.

In this embodiment, the step of measuring the received signal intensity is performed at step 13 under the condition that the step is repeated until the sum of the RSSI integrated values of the two antennas becomes larger than the predetermined threshold (actions 1 to 24). However, the step of measuring the received signal intensity can be performed once or can be performed until any one of the RSSI values becomes the predetermined threshold or more. The number of times at which the step of measuring the received signal intensity is performed is determined, and at a stage that the step is performed at that number of times, the transmitting antenna whose RSSI integrate value is the highest may be selected and fixed.

In the wireless communication system 10 of the present invention, the signals are sequentially transmitted/received to/from the individual transmitting antennas until the transmitting antenna wherein the received signal intensity is the highest is selected from the plurality of transmitting antennas. However, when the transmitting antenna is once selected, the signal can be transmitted from the transmitting antenna in a fixed manner. For this reason, establishment of the communication state can be accelerated, the battery consumption can be reduced, and the share of a wireless frequency space can be cut down.

In the above embodiment, the receiving unit 40 wirelessly communicates with one transmitting unit 20, but a system that wirelessly communicates with the plurality of transmitting units 40 and transmits/receives signals including RSSI can be constituted.

A constitution may be such that a plurality of receiving antennas 23 are provided to the receiving unit 40 and a combination of the receiving antenna 23 wherein the receiving quality is the highest and the transmitting antennas 24, 25 is selected by the method similar to the transmitting unit 20.

The above embodiment describes the case where the antenna switching method of the wireless communication system of the present invention is applied to the tightening torque measuring unit. However, the application of the present invention is not surely limited to the embodiment.

The present invention is useful as the antenna switching method of the wireless communication system having the plurality of transmitting antennas.

What is claimed is:

1. An antenna switching method of a wireless communication system, the wireless communication system including
a transmitting unit having a transmitting circuit for transmitting/receiving a signal, a plurality of transmitting antennas for transmission/reception, an antenna switch for switching any one of the plurality of the transmitting antennas to be connected to the transmitting circuit and a transmitting controller for controlling the transmitting circuit and the antenna switch, the transmitting circuit capable of transmitting a signal including a return request and transmitting/receiving another signals, and
a receiving unit having a receiving circuit for transmitting/receiving a signal to/from the transmitting unit, a receiving antenna connected to the receiving circuit, and a receiving controller for controlling the receiving circuit, the receiving controller transmitting a return signal from the receiving circuit when receiving the signal including the return request from the transmitting unit,
the antenna switching method comprising:
a received signal intensity measuring step including
a step of allowing the transmitting controller to operate the antenna switch so that any one of the transmitting antennas is connected to the transmitting circuit, transmitting the signal including the return request from the transmitting circuit via the transmitting antenna, standing by in a receiving state of the return signal, when receiving the signal including the return request, allowing the receiving controller to transmit the return signal including a received signal intensity value from the receiving circuit via the receiving antenna, and allowing the transmitting controller to store a received signal intensity of the return signal received by the transmitting antenna within a predetermined time, and
a step of operating the antenna switch and performing the above step on all the other transmitting antennas so as to obtain received signal intensities for all the transmitting antennas;
a step of allowing the transmitting controller to compare the obtained received signal intensities of all the transmitting antennas and determine the transmitting antenna wherein the received signal intensity is the highest;
a step of allowing the transmitting controller to operate the antenna switch so that the determined transmitting antenna wherein the received signal intensity is the highest is connected to the transmitting circuit and fix the transmitting antenna; and
a step of allowing the transmitting controller to transmit signals thereafter from the transmitting circuit via the fixed transmitting antenna, wherein the transmitting antennas are arranged in a peripheral direction of a rotatable member at predetermined intervals, and the received signal intensity measuring step is performed with the rotatable member being in a stopped or in an approximately stopped state.

2. The antenna switching method of the wireless communication system according to claim 1, wherein the received signal intensity measuring step is performed repeatedly at a plurality of times, and the transmitting controller compares the received signal intensities of the transmitting antennas.

3. The antenna switching method of the wireless communication system according to claim 1, wherein the rotatable member is a torque tightening unit attached to a tightening shaft of a tightening machine.

4. The antenna switching method of the wireless communication system according to claim 1, wherein the transmitting unit is of a battery-driven type.

* * * * *